United States Patent [19]

Brekner et al.

[11] Patent Number: 5,545,829
[45] Date of Patent: Aug. 13, 1996

[54] PROCESS FOR PREPARING CYCLOOLEFIN COPOLYMERS

[75] Inventors: Michael-Joachim Brekner, Frankfurt; Frank Osan, Kelkheim, both of Germany

[73] Assignee: Hoechst Aktiengesellschaft, Germany

[21] Appl. No.: 456,367

[22] Filed: Jun. 1, 1995

Related U.S. Application Data

[63] Continuation of Ser. No. 195,916, Feb. 10, 1994, abandoned.

[30] Foreign Application Priority Data

Feb. 12, 1993 [DE] Germany .......................... 43 04 287.2

[51] Int. Cl.⁶ .............................. C08F 2/04; C08F 232/08
[52] U.S. Cl. .............................. 526/160; 526/64; 526/67; 526/127; 526/170; 526/281; 526/283; 526/308; 526/348; 526/943
[58] Field of Search .................................. 526/943, 281, 526/283, 160, 170, 64, 308

[56] References Cited

U.S. PATENT DOCUMENTS

| | | | |
|---|---|---|---|
| 2,921,054 | 1/1960 | Kennedy | 526/64 |
| 4,339,236 | 7/1982 | Decker et al. | 8/137 |
| 4,896,704 | 1/1990 | Aly | 141/9 |

FOREIGN PATENT DOCUMENTS

| | | |
|---|---|---|
| 622337 | 4/1992 | Australia . |
| 11465/92 | 9/1992 | Australia . |
| 2080576 | 4/1993 | Canada . |
| 0407870 | 1/1991 | European Pat. Off. . |
| 0503422 | 9/1992 | European Pat. Off. ............... 526/160 |
| 861963 | 3/1961 | United Kingdom . |
| 1055641 | 1/1967 | United Kingdom . |

OTHER PUBLICATIONS

M. Sittig, "Polyolefin Resin Processes", 60 (1961) Gulf (Houston).

*Primary Examiner*—Fred Zitomer
*Attorney, Agent, or Firm*—Connolly & Hutz

[57] ABSTRACT

Process for preparing cycloolefin copolymers Process for preparing cycloolefin polymers from cyclic and acylcic olefin monomers using a catalyst system in a reaction space, wherein the residence time of the monomers in the reaction space is separated from the residence time of the catalyst system in the reaction space.

18 Claims, 3 Drawing Sheets

PROCESS FOR PREPARING CYCLOOLEFIN COPOLYMERS

Continuation of Ser. No. 08/195,916, Feb. 10, 1994, abandoned.

The invention relates to a process for preparing cycloolefin copolymers (COCs).

Various processes are already known for preparing COCs, these being based on different catalysts (EP-A0 156 464, EP-A0 203 799, DD-237 070, EP-A0 355 682, EP-A0 485 893, EP-A0 503 422).

The disadvantage of these catalysts is due to the fact that, on the one hand, the metallocene compounds in particular are relatively expensive and, on the other, cocatalysts, usually a specific aluminum alkyl, which are also relatively expensive have to be used. In addition, particularly metallocenes which are particularly selective and produce very advantageous property profiles, at the same time have certain weaknesses in respect of catalyst activity (specific monomer incorporation per unit time).

It is the object of the present invention to provide a process for preparing COCs from cyclic and acyclic olefin monomers using a suitable catalyst system, which process makes it possible to considerably reduce catalyst consumption and cocatalyst costs, as far as possible independently of the desired property profile of the cycloolefin copolymers.

This object is achieved by a process for preparing COCs from cyclic and acyclic olefin monomers using a catalyst system in a reaction space, wherein the residence time of the monomers in the reaction space is separated from the residence time of the catalyst system in the reaction space. It is therefore designated as a "process having separate (i.e. different) residence times".

The separation of the residence times of the monomers and of the catalyst system is achieved firstly by fixing the catalyst system on a support and secondly by installing a porous partition in the reaction space.

In the first measure, the catalyst, which together with at least one cocatalyst forms the catalysis system, is fixed on a support so that the catalyst is largely retained on the support under the reaction conditions. The second measure, by use of a porous partition which although permeable to the polymer solution is largely impermeable to the supported catalyst, prevents the catalyst from being carried out with the polymer solution.

The catalyst can be applied to the support by various methods. Preference is given to a process which is described, for example, in European Patent Application EP 92107331.8, and particular preference is given to a new type of process in which application to the support is carried out with the aid of microwaves (P 4304 286.4). Both these documents are hereby expressly incorporated by reference. The latter process comprises bringing the catalyst and the cocatalyst supported on a support material into contact in a suspension solution and fixing the catalyst on the support material under the action of microwaves.

Suitable support materials are, for example, silica gels, aluminum oxides, solid aluminoxane or other inorganic support materials such as, for example, magnesium chloride. Another suitable support material is a partly crystalline polyolefin powder which is insoluble under the polymerization conditions and in finely divided form.

The particle size of the support material may be chosen within a very wide range. However, care should be taken that, in addition to a very large coatable area, good retention by the partition is also thereby ensured. So as to provide a large coatable area, support particles having average diameters of 5–250 μm are preferred. Particular preference is given to sizes of 10–120 μm. The particle diameter of the support should be at least 5 times, preferably more than 10 times, the average pore width of the porous partition in the reaction space.

In selecting the supports, attention should be paid not only to the chemical composition of the surface and the average particle size but also to the size distribution of the support particles. As narrow as possible a size distribution is preferred, because better matching to the porosity of the partition is thereby possible. If despite this a certain proportion of fines cannot be avoided, the support particles should be sieved through a sieve which is comparable to the porosity of the partition in the reaction zone, prior to the process for supporting the catalyst.

Figure 1:
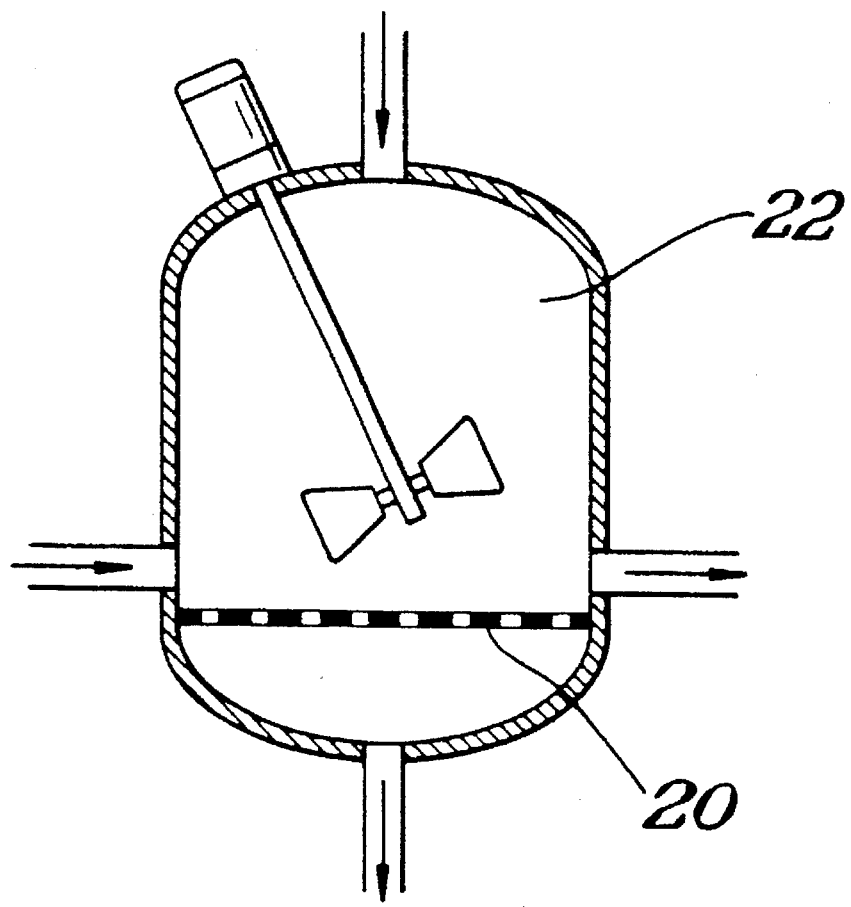
FIG. 1 shows a reactor construction according to this invention.
Figure 2:
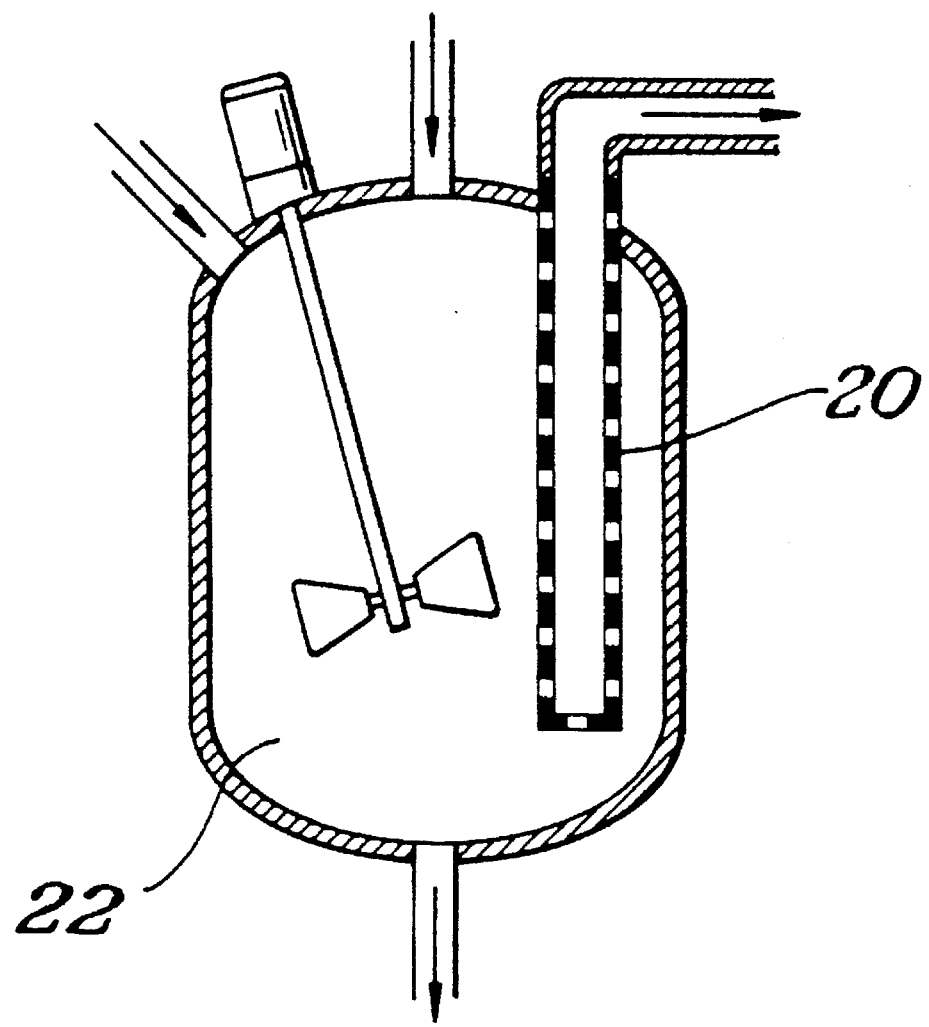
FIG. 2 shows another reactor construction according to this invention.
Figure 3:
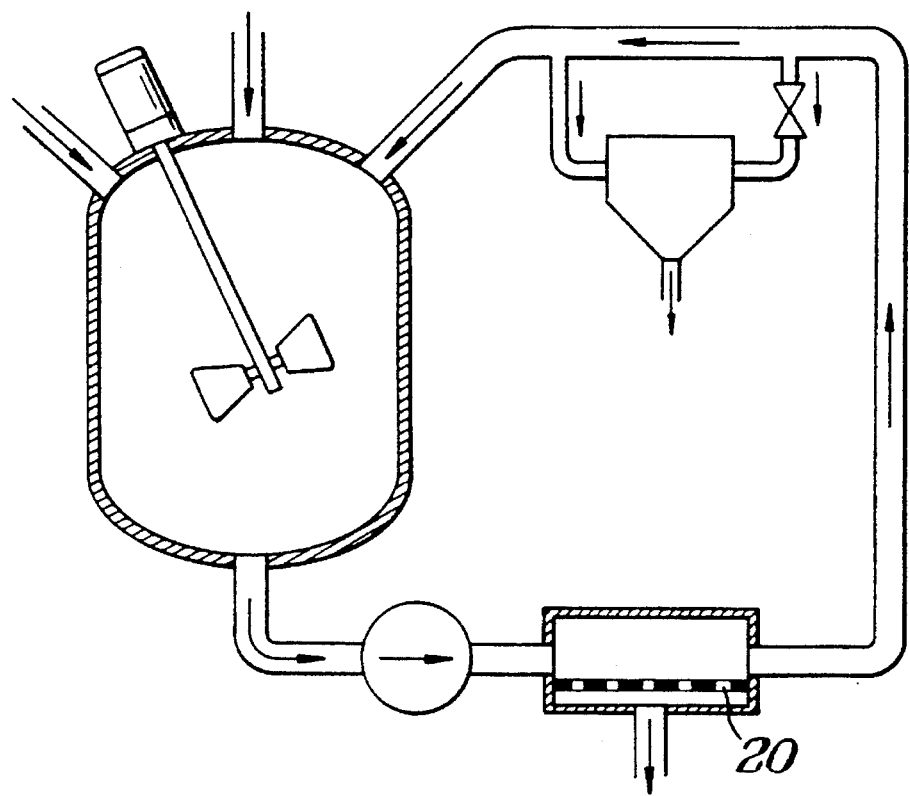
FIG. 3 shows still another reactor construction according to this invention.

The porous separation wall or partition 20, as shown schematically in FIGS. 1 to 3, is represented by a bold broken line. This partition substantially retains the supported catalyst system in the reaction space 22, whereas the monomers and the inert solvent can pass unhindered through the partition and leave the reactor as cycloolefin copolymer solution. The residence time of the supported catalyst system is thereby extended in comparison with that of the monomers and of the solvent. The process becomes more economical, the longer the residence time of the catalyst in comparison with the residence time of the monomers in the reaction space 22.

The larger the size ratio of the particle size of the supported catalyst system to the porosity of the partition, the less supported catalyst can be carried out of the reaction space with the polymer solution over time. Depending on the reactor principle and the reactor construction (cf., for example, FIGS. 1 to 3), there is formed, during polymerization, a larger or smaller proportion of fines caused by abrasion of the supported catalyst system, which fine material can then be carried out, thus limiting the residence time of the catalyst.

A further decisive factor in the residence time of the catalyst is the stability of the fixing of the catalyst or cocatalyst. In the case of poor fixing, the catalyst system with time dissolves from the support and is then carried out with the polymer solution.

A further cause of a certain limitation of the residence time of the catalyst can also be increasing contamination of the catalyst with time. The residence time thereof decreases particularly quickly when the monomers and solvents fed in contain minor impurities. These are therefore preferably decontaminated with an inertizing reagent.

The separation wall or partition 20 may have various shapes and be applied to various reactor constructions (cf. FIGS. 1 to 3). The reaction space can also be composed of a number of reaction zones which have different polymerization conditions in the individual reaction zones.

The partition can be built up of different porous materials. For example, such partitions can be manufactured from ceramic filter plates, woven metal filters, metal nonwovens and multilayer filters which may contain woven and nonwoven fabrics. The average porosity should lie between 0.1 and 50 μm, preferably between 0.25 and 20 μm and particularly preferably between 2 and 10 μm. The pore size distribution should be as narrow as possible.

The process of the invention can be operated continuously or batchwise. Preference is given to continuous operation in which catalyst and monomers and solvents are added continuously and the polymer solution and parts of the so-called "used catalyst" are continuously taken from the reactor.

For the synthesis of COCs according to the process of the invention, the monomers which can be used are from 0.1 to 99.9% by weight, based on the total amount of monomers, of at least one monomer of the formulae I, II, III or IV

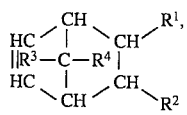  (I)

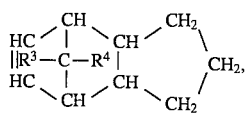  (II)

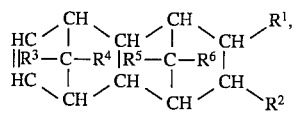  (III)

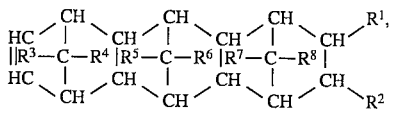  (IV)

in which $R^1$, $R^2$, $R^3$, $R^4$, $R^5$, $R^6$, $R^7$ and $R^8$ are identical or different and are a hydrogen atom or a $C_1$–$C_8$-alkyl radical or aryl radical, where identical radicals in the various formulae may have different meanings, from 0.1 to 99.9% by weight, based on the total amount of monomers, of a cycloolefin of the formula V

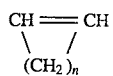  (V)

in which n is a number from 2 to 10, and from 0.1 to 99.9% by weight, based on the total amount of monomers, of at least one acyclic 1-olefin of the formula VI

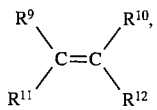  (VI)

in which $R^9$, $R^{10}$, $R^{11}$ and $R^{12}$ are identical or different and are a hydrogen atom or a $C_1$–$C_8$-alkyl radical, and are polymerized in solution, in suspension, in the liquid cycloolefin monomer or cycloolefin monomer mixture or in the gas phase, at a temperature from −78° to 150° C., at a pressure from 0.5 to 64 bar, in the presence of a supported catalyst system which comprises at least one aluminoxane of the formula VII

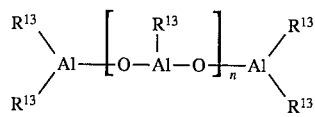  (VII)

for the linear type and/or of the formula VIII

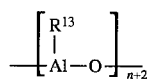  (VIII)

for the cyclic type, wherein in the formulae VII and VIII $R^{13}$ is a $C_1$–$C_6$-alkyl group or phenyl or benzyl and n is an integer from 2 to 50, and at least one metallocene compound of the formula IX

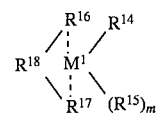  (IX)

in which $M^1$ is titanium, zirconium, hafnium, vanadium, niobium or tantalum, $R^{14}$ and $R^{15}$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, m can be one or two, depending on the valency of the central atom $M^1$, $R_{18}$ is

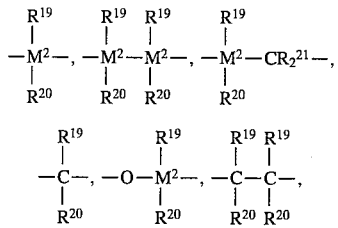

$=BR^{19}$, $=AlR^{19}$, —Ge—, —Sn—, —O—, —S—, $=SO$, $=SO_2$, $=NR^{19}$, $=CO$, $=PR^{19}$ or $=P(O)R^{19}$, where $R^{19}$, $R^{20}$ and $R^{21}$ are identical or different and are a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or $R^{19}$ and $R^{20}$ or $R^{19}$ and $R^{21}$ in each case form a ring with the atoms connecting them, $M^2$ is silicon, germanium or tin, $R^{16}$ and $R^{17}$ are identical or different and are a mononuclear or multinuclear hydrocarbon radical which can form a sandwich structure with the central atom $M^1$.

The monomers polymerized include at least one polycyclic olefin of the formula I, II, III or IV, preferably a cycloolefin of the formula I or III,

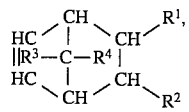  (I)

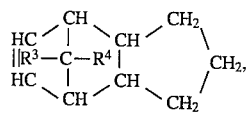  (II)

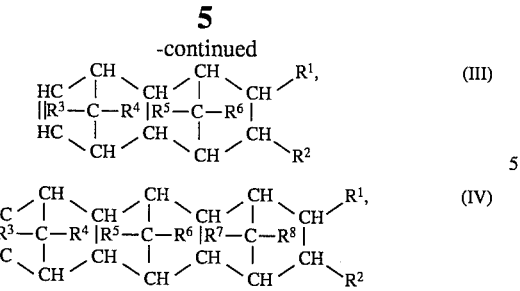

(III)

(IV)

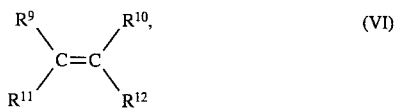

in which $R^1$, $R^2$, $R^3$, $R^4$, $R^5$, $R^6$, $R^7$ and $R^8$ are identical or different and are a hydrogen atom or a $C_1$–$C_8$-alkyl radical or a $C_1$–$C_{16}$-aryl radical, where identical radicals in the various formulae can have different meanings.

If desired, a monocyclic olefin of the formula V $$\underset{(CH_2)_n}{CH=CH}$$ (V)

in which n is a number from 2 to 10, is also used.

Another comonomer is an acyclic 1-olefin of the formula VI, $$\underset{R^{11}}{\overset{R^9}{\diagdown}}C=C\underset{R^{12}}{\overset{R^{10}}{\diagup}},$$ (VI)

in which $R^9$, $R^{10}$, $R^{11}$ and $R^{12}$ are identical or different and are a hydrogen atom or a $C_1$–$C_8$-alkyl radical, which may also contain a double bond, or a $C_6$–$C_{16}$-aryl radical. Preference is given to ethylene, propylene, butene, hexene, octene or styrene. Particular preference is given to ethene. In addition, dienes can also be used.

In particular, copolymers of polycyclic olefins of the formula I and II are prepared.

The polycyclic olefin (I to IV) is used in an amount from 0.1 to 99.9% by weight, the monocyclic olefin (V) in an amount from 0 to 99.9% by weight and the acyclic 1-olefin (VI) in an amount from 0.1 to 99.9% by weight, in each case based on total amount of monomers.

The monomers are preferably used in the following ratios:
a) the molar monomer ratio of polycyclic olefin (I to IV) to 1-olefin (VI) is, in the corresponding polymers, from 1:99 to 99:1, preferably from 20:80 to 80:20;
b) in polymers of polycyclic olefins (I to IV) and monocyclic olefins (V), the molar ratio of polycyclic olefin to monocyclic olefin is from 10:90 to 90:10;
c) in polymers of polycyclic olefins (I to IV), monocyclic olefins (V) and 1-olefins (VI), the molar monomer ratio of polycyclic olefin to monocyclic olefin to 1-olefin is from 93:5:2 to 5:93:2 to 5:5:90, i.e. the molar ratio lies within a mixing triangle whose corners are fixed by the molar ratios 97:1:2, 5:93:2 and 5:1:94;
d) in a), b) and c), polycyclic olefins, monocyclic olefins and 1-olefins are to be taken to include mixtures of two or more olefins of the respective type.

The catalyst used in the polymerization comprises an aluminoxane and at least one metallocene of the formula IX. In formula IX, $M^1$ is a metal selected from the group comprising titanium, zirconium, hafnium, vanadium, niobium and tantalum, preferably zirconium and hafnium.

$R^{14}$ and $R^{15}$ are identical or different and are a hydrogen atom, a $C_1$–$C_{10}$-, preferably
$C_1$–$C_3$-alkyl group, a $C_1$–$C_{10}$-, preferably
$C_1$–$C_3$-alkoxy group, a $C_6$–$C_{10}$-, preferably
$C_6$–$C_8$-aryl group, a $C_6$–$C_{10}$-, preferably
$C_6$–$C_8$-aryloxy group, a $C_2$–$C_{10}$-, preferably
$C_2$–$C_4$-alkenyl group, a $C_7$–$C_{40}$-, preferably
$C_7$–$C_{10}$-arylalkyl group, a $C_7$–$C_{40}$-, preferably
$C_7$–$C_{12}$-alkylaryl group, a $C_8$–$C_{40}$-, preferably
$C_8$–$C_{12}$-arylalkenyl group or a halogen atom, preferably chlorine, m can be one or two, depending on the valency of the central atom $M^1$, $R^{14}$ and $R^{17}$ are identical or different and are a mononuclear or multinuclear hydrocarbon radical which can form a sandwich structure with the central atom $M^1$.

Preferably $R^{14}$ and $R^{17}$ are, independently of one another, indenyl, fluorenyl, cyclopentadienyl, where these can also bear one or more hydrocarbon radicals.

$R^{18}$ is a single-membered or multi-membered bridge which links the radicals $R^{16}$ and $R^{17}$ and is

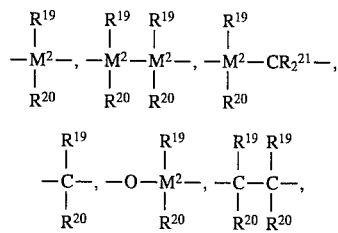

$=BR^{19}$, $=AlR^{19}$, $-G-$, $-Sn-$, $-O-$, $-S-$, $=SO$, $=SO_2$, $=NR^{19}$, $=CO$, $=PR^{19}$ or $=P(O)R^{19}$, where $R^{20}$ and $R^{21}$ are identical or different and are a hydrogen atom, a halogen atom, preferably chlorine, a $C_1$–$C_{10}$- preferably $C_1$–$C_3$-alkyl group, in particular a methyl group, a $C_1$–$C_{10}$-fluoroalkyl group, preferably a $CF_3$ group, a $C_6$–$C_{10}$-fluoroaryl group, preferably a pentafluorophenyl group, a $C_6$–$C_{10}$-, preferably $C_6$–$C_8$-aryl group, a $C_1$–$C_{10}$-, preferably $C_1$–$C_4$-alkoxy group, in particular a methoxy group, a $C_2$–$C_{10}$-, preferably $C_2$–$C_4$-alkenyl group, a $C_7$–$C_{40}$, preferably $C_7$–$C_{10}$-arylalkyl group, a $C_8$–$C_{40}$, preferably $C_8$–$C_{12}$-arylalkenyl group or a $C_7$–$C_{40}$, preferably $C_7$–$C_{12}$-alkylaryl group, or $R^{19}$ and $R^2$ or $R^{19}$ and $R^{21}$ in each case form a ring together with the atoms connecting them.

$M^2$ is silicon, germanium or tin, preferably silicon or germanium.

$R^{18}$ is preferably $=CR^{19}R^{20}$, $=SiR^{19}R^{20}$, $=GeR^{19}R^{20}$, $-O-$ $-S-$, $=SO$, $=PR^{19}$ or $=P(O)R^{19}$.

The metallocenes can be prepared as described, for example, in EP-A0 355 682.

Preferred metallocenes are:
biscyclopentadienylzirconium dichloride
biscyclopentadienylzirconium dimethyl
biscyclopentadienylzirconium diphenyl
biscyclopentadienylzirconium dibenzyl
biscyclopentadienylzirconium bistrimethylsilyl
bis(methylcyclopentadienyl)zirconium dichloride
bis(1,2-dimethylcyclopentadienyl)zirconium dichloride
bis(1,3-dimethylcyclopentadienyl)zirconium dichloride
bis(1,2,4-trimethylcyclopentadienyl)zirconiumdichloride
bis(pentamethylcyclopentadienyl)zirconium dichloride
bis(ethylcyclopentadienyl)zirconium dichloride
bis(propylcyclopentadienyl)zirconium dichloride
bis(butylcyclopentadienyl)zirconium dichloride
bisfluorenylzirconium dichloride
bisindenylzirconium dichloride
diphenylmethylene(9-fluorenyl)(cyclopentadienyl)zirconium dichloride
diphenylmethylene(9-fluorenyl)(cyclopentadienyl)hafnium dichloride
dimethylsilyl-bis(cyclopentadienyl)zirconium dichloride
dimethylsilyl(9-fluorenyl)(cyclopentadienyl)zirconium dichloride dimethylsilyl(9-fluorenyl)(cyclopentadienyl)hafnium dichloride
isopropylidene(9-fluorenyl)(cyclopentadienyl)zirconium dichloride
isopropylidene(9-fluorenyl)(cyclopentadienyl)hafnium dichloride
dimethylsilyl-bis(9-fluorenyl)zirconium dichloride
dimethylsilyl-bis-1-tetrahydroindenylzirconium dichloride
dimethylsilyl-bis-1-(2-methyl-tetrahydroindenyl)zirconium dichloride
dimethylsilyl-bis-1-(2,3,5-trimethyl-cyclopentadienyl)zirconium dichloride
dimethylsilyl-bis-1-(2,3-dimethyl-cyclopentadienyl)zirconium dichloride
dimethylsilyl-bis-1-indenylzirconium dichloride
dimethylsilyl-bis-1-indenylzirconium dimethyl
dimethylgermyl-bis-1-indenylzirconium dichloride
dimethylsilyl-bis-1-(2-methylindenyl)zirconium dichloride
dimethylsilyl-bis-1-(2-methyl-4-isopropylindenyl)zirconium dichloride
phenylmethylsilyl-bis-1-(2-methylindenyl)zirconium dichloride
dimethylsilyl-bis-1-(2-methyl-4-ethylindenyl)zirconium dichloride
ethylene-bis-1-(4,7-dimethylindenyl)zirconiumdichloride
phenyl(methyl)silyl-bis-1-indenylzirconium dichloride
phenyl(vinyl)silyl-bis-1-indenylzirconium dichloride
diphenylsilyl-bis-1-indenylzirconium dichloride
dimethylsilyl-bis-1-(2-methyl-4-tert.butylindenyl)zirconium dichloride
methylphenylsilyl-bis-1-(2-methyl-4-isopropylindenyl)zirconium dichloride
dimethylsilyl-bis-1-(2-ethyl-4-methylindenyl)zirconium dichloride
dimethylsilyl-bis-1-(2,4-dimethylindenyl)zirconium dichloride
dimethylsilyl-bis-1-(2-methyl-4-ethylindenyl)zirconium dimethyl
dimethylsilyl-bis-1-(2-methyl-4,6-diisopropylindenyl)zirconium dichloride
dimethylsilyl-bis-1-(2,4,6-trimethylindenyl)zirconium dichloride
methylphenylsilyl-bis-1-(2-methyl-4,6-diisopropylindenyl)zirconium dichloride
1,2-ethanediyl-bis-1-(2-methyl-4,6-diisopropylindenyl)zirconium dichloride
dimethylsilyl-bis-1-(2-methyl-4,5-benzoindenyl)zirconium dichloride
dimethylsilyl-bis-1-(2-methyl-4-phenylindenyl)zirconium dichloride
ethylene-bis(1-indenyl)zirconium dichloride
ethylene-bis-1-(4,5,6,7-tetrahydroindenyl)zirconium dichloride
ethylene-bis(1-indenyl)hafnium dichloride
dimethylsilyl-bis-1-(4,5-benzoindenyl)zirconium dichloride
isopropyl-(cyclopentadienyl)(1-indenyl)zirconium dichloride
isopropyl-(3-methylcyclopentadienyl)(1-indenyl)zirconium dichloride
dimethylsilyl-(cyclopentadienyl)(1-indenyl)zirconium dichloride
dimethylsilyl-bis(3-methylcyclopentadienyl)zirconium dichloride
dimethylsilyl-bis(2,4-dimethylcyclopentadienyl)zirconium dichloride
methylethylene-bis(1-indenyl)zirconium dichloride
methylphenylcarbyl(9-fluorenyl)(cyclopentadienyl)zirconium dichloride
diphenylsilyl(9-fluorenyl)(cyclopentadienyl)zirconium dichloride
dimethylsilyl(9-(2,7-ditertbutylfluorenyl))(cyclopentadienyl)zirconium dichloride
diphenylcarbyl(9-(2,7-ditertbutylfluorenyl))(cyclopentadienyl)zirconium dichloride
isopropyl(9-(2,7-ditertbutylfluorenyl))(cyclopentadienyl)zirconium dichloride
isopropyl(9-fluorenyl)(1-(3-methylcyclopentadienyl))zirconium dichloride
isopropyl(9-fluorenyl)(1-(3-isopropylcyclopentadienyl))zirconium dichloride
dimethylsilyl(9-fluorenyl)(1-(3-methylcyclopentadienyl))zirconium dichloride
dimethylsilyl(9-fluorenyl)(1-(3-isopropylcyclopentadienyl))zirconium dichloride
isopropyl(9-fluorenyl)(1-indenyl)zirconium dichloride
dimethylsilyl(9-fluorenyl)(1-indenyl)zirconium dichloride In preparing the catalyst system of the invention, chiral metallocenes are preferably used in the form of the racemate. However, the pure R or S form can also be used. In the case of preparation of highly tactic polyolefins, the meso form of the metallocenes should be separated therefrom prior to use. Zirconium and hafnium are preferred as the central atom of the metallocenes, particular preference is given to zirconium.

Particularly preferred metallocenes are:
biscyclopentadienylzirconium dichloride
bisindenylzirconium dichloride
diphenylmethylene(9-fluorenyl)(cyclopentadienyl)zirconium dichloride
dimethylsilyl-bis(cyclopentadienyl)zirconium dichloride
dimethylsilyl(9-fluorenyl)(cyclopentadienyl)zirconium dichloride
isopropylidene(9-fluorenyl)(cyclopentadienyl)zirconium dichloride
dimethylsilyl-bis-1-indenylzirconium dichloride
diphenylsilyl-bis-1-indenylzirconium dichloride
ethylene-bis(1-indenyl)zirconium dichloride
isopropyl-(cyclopentadienyl)(1-indenyl)zirconium dichloride
isopropyl-(3-methylcyclopentadienyl)(1-indenyl)zirconium dichloride
dimethylsilyl-(cyclopentadienyl)(1-indenyl)zirconium dichloride
methylphenylcarbyl(9-fluorenyl)(cyclopentadienyl)zirconium dichloride
isopropyl(9-fluorenyl)(1-(3-methylcyclopentadienyl))zirconium dichloride
isopropyl(9-fluorenyl)(1-(3-isopropylcyclopentadienyl))zirconium dichloride The cocatalyst is an aluminoxane of the formula VII

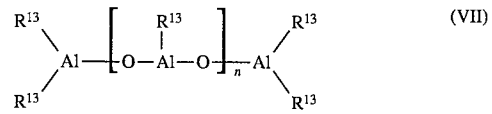

for the linear type and/or of the formula VIII

for the cyclic type. In these formulae, $R^{13}$ is a $C_1$–$C_6$-alkyl group, preferably methyl, ethyl or isobutyl, butyl or neopentyl, or phenyl or benzyl. Particular preference is given to methyl. n is an integer from 2 to 50, preferably from 5 to 40.

However, the exact structure of the aluminoxane is not known.

The aluminoxane which is preferably used in supported form can be prepared in various ways, as are described, for example, in EP-A0 355 682.

Decontamination of the monomers and the solvent can be carried out using economical aluminum alkyls such as, for example, triisobutylaluminum. For this purpose, aluminum alkyl concentrations in the reaction space from 0.0001 to 20 g/l, preferably from 0.001 to 5 g/l and particularly preferably from 0.01 to 2 g/l, are used.

The polymerization is carried out in an inert solvent or suspension medium which is customary for the Ziegler low pressure process, for example in an aliphatic or cycloaliphatic hydrocarbon; examples of such a hydrocarbon are butane, pentane, hexane, heptane, isooctane, cyclohexane, methylcyclohexane and decalin. In addition, it is also possible to use a petroleum fraction or hydrogenated diesel oil fraction which has been carefully freed of oxygen, sulfur compounds and moisture. Toluene and Xylene can also be used.

Finally, the monomer to be polymerized can also be used as solvent or suspension medium. In the case of pure norbornene, the polymerization is carried out, for example, at a temperature above 45° C. The molecular weight of the polymer can be regulated in a known manner; preferably hydrogen is used for this purpose.

The polymerization is most preferably carried out in solution, continuously or batchwise, in one or more stages at a temperature from −78° to 150° C., preferably from −20° to 120° C. The pressure is from 0.5 to 64 bar and is maintained either by the gaseous olefins or with the aid of inert gas.

Continuous and multistage processes are particularly advantageous, because they enable efficient use of the polycyclic olefin which is recirculated as residual monomer together with the reaction mixture.

In the preparation of copolymers, the molar ratio of the polycyclic olefin to the 1-olefin used can be varied within a wide range. Selection of the polymerization temperature, the concentration of the catalyst components and the molar ratio used allow the amount of comonomer incorporated to be controlled to almost any value desired.

The process of the invention offers the advantage of being able to save considerable amounts of expensive catalysts and cocatalysts.

EXAMPLES

For the tests using the supported aluminum compound (methylaluminoxane on silica gel), hereinafter referred to a "MAO on SiO$_2$, type A", an about 10% by weight suspension was prepared in n-decane, this contained 60 mg of Al/ml according to an aluminum determination.

In addition, a solvent-free supported methylaluminoxane on silica gel, hereinafter referred to as "MAO on SiO$_2$, type B", containing 20% (by weight) of aluminum in the solids was prepared.

Abbreviations

VN=viscosity number in cm$^3$/g
M$_w$=weight average molecular weight in g/mol (determined by gel permeation chromatography)
M$_w$/M$_n$=dispersity of molecular weight
mp=melting point in ° C. (determined by DSC, 20° C./min heating/cooling rate)

II=isotactic index (II=mm+½ mr, determined by $^{13}$C-NMR spectroscopy)
MFI/(230/5)=melt flow index, measured in accordance with DIN 53735; in dg/min
BD=bulk density of polymer in g/dm$^3$.

Example 1

3.9 g of "MAO on SiO$_2$, type B" having an average particle size of about 80 μm, were suspended in a mechanically stirrable vessel in 60 ml of toluene, and the mixture was cooled to −30° C.

At the same time, 65 mg (0.15 mmol) of isopropyl-(9-fluorenyl)cyclopentadienylzirconium dichloride are dissolved in 40 ml of toluene and added dropwise to the suspension. The cold reaction mixture is introduced into a microwave apparatus. While stirring in an inert gas stream at a microwave frequency of 2.45 GHz and microwave power of 500 W, the mixture is heated to 80° C. over a period of 15 minutes, the suspension taking on a red color. The radiation power is adjusted so that the suspension is maintained at this temperature for one hour (250 W, pulsed). The mixture is subsequently filtered and the red dye is washed three times with 50 ml of toluene. Analysis of the pale red filtrate gives a zirconium content of 0.9 mg (corresponds to 4.3 mg of isopropyl-(9-fluorenyl)cyclopentadienylzirconium dichloride). The solid is dried in vacuo. 3 g of free-flowing violet supported catalyst containing 20 mg of zirconocene per gram of catalyst are obtained.

Example 2 (Comparative Example)

20 ml of the suspension of the "MAO on SiO$_2$ type A" (45 mmol of Al) were introduced under argon into a G3 Schlenk frit and admixed with a solution of 4.2 mg of isopropyl(9-fluorenyl)cyclopentadienylzirconium dichloride in 10 ml of toluene (9.7 μmol of Zr). The reaction mixture was stirred for 30 minutes at room temperature during which a spontaneous color change to violet gradually faded. The mixture was subsequently filtered and the solid was washed 3 times with 10 ml of hexane. The supported catalyst was obtained moist with hexane as filter residue 2.

Example 3

A clean and dry 1.5 l polymerization reactor fitted with stirrer was flushed first with nitrogen and then with ethylene. The reactor was charged with 600 ml of a norbornene solution in toluene (411 g of norbornene and 86 ml of toluene). The solution was admixed with 2 ml of a 20% by weight strength solution of tri(n-butyl)aluminum in toluene. Subsequently, the temperature in the reactor was set to 70° C. and the ethylene pressure was set to bar.

210 mg of the catalyst powder prepared according to Example 1 were suspended in 10 ml of dry hexane in a 25 ml Schlenk vessel. This suspension was introduced into the reactor via a transfer tube and the ethylene pressure was maintained at a constant 6 bar for 60 minutes by metering in further amounts of ethylene. The ethylene uptake was continuously monitored by means of a mass flowmeter from Brooks. Over the duration of the polymerization, the ethylene uptake was an almost constant 9 l/h (standard liters/hour).

The polymerization was terminated after 60 minutes by addition of 100 ml of toluene moist with water (saturated at room temperature). The contents of the reactor were then filtered over a period of 4 minutes through a 3 l pressure filter heated to 70° C. and having an inserted filter layer T5500 from Seitz, at a gage pressure of 2.5 bar in the pressure filter. A clear solution was obtained. The solution was subsequently precipitated in 5 l of acetone and the solid washed with 3 l of acetone. The precipitated powder was dried at 100° C. and 0.2 bar for 15 hours.

A total of 51.4 g of norbornene/ethylene copolymer were obtained. The glass transition temperature was 154° C. and the viscosity number (solution viscosity) was 180 ml/g.

Example 4 (Comparative Example)

The procedure was as in Example 3, with the difference that the whole of the filter residue moist with hexane, which is obtained in a catalyst preparation according to Example 2, was resuspended in 10 ml of dry hexane and then used in the polymerization. At the beginning of the polymerization the ethylene uptake was 9.3 l/h, but over 60 minutes fell markedly to 6.7 l/h. The filtration, carried out under the same conditions as in Example 9, took 18 minutes.

44.6 g of product were obtained. The glass transition temperature was 152° C. and the viscosity number was 169 ml/g.

Example 5

The apparatus used in this experiment comprises:

a 1.5 l reactor fitted with stirrer, transfer tube and an ascending pipe to the end of which is screwed a cylindrical filter candle which comprises a support tube and a multilayer metal filter whose porosity of 5 μm is determined by a metal nonwoven bedded in between woven metal fabrics;

a 15 l feed vessel which is connected to the reactor via a diaphragm pump;

a 0.1 l pressure vessel which serves as catalyst storage and is connected to the reactor via a 1 ml transfer tube;

a 2 l decompression vessel which is connected to the ascending pipe and the bottom valve of the reactor via two valves which can both be operated in a pulsed mode.

The 15 l feed vessel is charged with a solution containing 1250 g of norbornene, 270 ml of toluene and 3.5 g of tri(-butyl)aluminum.

The 0.1 l pressure vessel was charged with a catalyst suspension comprising 1 g of a supported catalyst prepared according to Example 1 and 48 ml of hexane. The clean and dry reactor was then brought to 70° C. and charged with 600 ml of norbornene solution from the feed vessel. It was subsequently pressurized with ethylene to 6 bar and, after saturation, 10 ml of the catalyst suspension were added from the pressure vessel. During the further course of the experiment, the ethylene pressure was maintained at a constant 6 bar by metering in further amounts. The temperature was also set to a constant 70° C. After 60 minutes, a flow of 0.6 l/h was continuously taken off via the pulsed valve and the ascending pipe. At the same time, the diaphragm pump started to feed the same flow into the reactor from the norbornene feed vessel. The ethylene uptake was continuously monitored by means of a mass flow meter from Brooks. While during the first 60 minutes it fell from 8.7 l/h (standard liters/l) to 8.2 l/h, during the next 60 minutes a further decrease to 7.8 l/h was recorded. The solution taken off was precipitated as in Example 3 and the polymer product was subsequently dried. During the 120 minutes, a total of 88.5 g of norbornene/ethylene copolymer were obtained. The glass transition temperature was 156° C. and the viscosity number was 176 ml/g.

Example 6 (Comparative Example)

The experiment was carried out in the same way as Example 5, with the following differences:

after 60 minutes the reaction solution was taken off via the bottom valve rather than via the ascending pipe;

the ethylene uptake at the beginning was 9.1 l/h, after 60 minutes was 8.7 l/h and after a further 60 minutes was 4.7 l/h.

Over the 120 minutes, a total of 72.2 g of polymer were obtained. The glass transition temperature was 154° C. and the viscosity number was 165 ml/g.

Example 7

1 g of the dried catalyst from Example 1 is suspended in 50 ml of hexane for the polymerization.

In parallel thereto, a dry 16 dm$^3$ reactor was flushed first with nitrogen and subsequently with propylene and was then charged with 10 dm$^3$ of liquid propylene. 3 cm$^3$ of triisobutylaluminum (pure, 12 mmol), diluted with 30 ml of hexane, were then introduced into the reactor and the mixture was stirred at 30° C. for 15 minutes. Subsequently, the prepared catalyst suspension was introduced into the reactor, the mixture was heated to the polymerization temperature of 70° C. (4° C./min) by supplying heat and the polymerization system was maintained at 70° C. for 1 hour by cooling. The polymerization was terminated by addition of 20 ml of isopropanol. The excess monomer was vented, the polymer was dried in vacuo.

600 g of coarse-grained polypropylene powder resulted. The reactor had no deposits on the interior wall or the stirrer. The catalyst activity was thus 30 kg of PP/g of metallocene× h.

Example 8

1 g of the dried catalyst from Example 1 is suspended in 100 ml of absolute toluene saturated with inert gas. The suspension is heated at 80° C. for three hours under protective gas. After cooling to room temperature, it is filtered through a G3 frit. The filtrate is colorless. The violet filter residue is washed with hexane and subsequently suspended in 50 ml of hexane for the polymerization. The polymerization is carried out in the same way as in Example 7. 530 g of coarse-grained polypropylene powder resulted. The reactor had no deposits on the interior wall or on the stirrer. The catalyst activity was thus 26.5 kg of PP/g of metallocene ×h.

Example 9 (Comparative Example)

The filter residue of the catalyst system prepared according to Example 2 and moist with hexane is suspended in 50 ml of hexane for the polymerization. The polymerization is carried out in the same way as Example 7. 250 g of a fine-grained polypropylene powder resulted. The reactor had deposits on the interior wall and on the stirrer. The catalyst activity was thus 60 kg of PP/g of metallocene×h.

Example 10 (Comparative Example)

The filter residue of the catalyst system prepared according to Example 2 and moist with hexane is suspended in 100 ml of absolute toluene saturated with inert gas. The suspension is heated at 80° C. for three hours under protective gas.

After cooling to room temperature, it is filtered through a G3 frit. The filtrate is red in color. The filter residue is washed with hexane and subsequently suspended in 50 ml of hexane for the polymerization. The polymerization is carried out in the same way as Example 7. No polypropylene powder resulted.

What is claimed is:

1. A process for preparing cycloolefin polymers from cyclic and acyclic olefin monomers carried out in a suspension medium using a catalyst system in a reaction space, which comprises separating the residence time of the monomers in the reaction space from the residence time of the catalyst system in the reaction space in which process the polymer is taken from the reactor as a solution.

2. The process as claimed in claim 1, wherein the separation of the residence times of the monomers and of the catalyst system is achieved by fixing the catalyst system on a support and by installing a porous partition in the reaction space.

3. The process as claimed in claim 2, wherein the fixing of the catalyst and/or of the cocatalyst on the support is carried out under the action of microwaves.

4. The process as claimed in claim 2, wherein the average porosity of the partition lies between 0.1 and 50 μm.

5. The process as claimed in claim 2, wherein the support materials used are silica gels, aluminum oxides, solid aluminoxane or other inorganic support materials.

6. The process as claimed in claim 1, wherein the catalyst system comprises at least one metallocene catalyst and at least one cocatalyst.

7. The process as claimed in claim 1,
wherein the monomers used are from 0.1 to 99.9% by weight, based on the total amount of monomers, of at least one monomer of the formulae I, II, III or IV

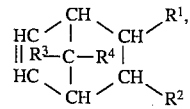 (I)

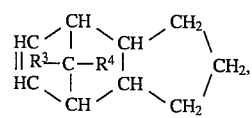 (II)

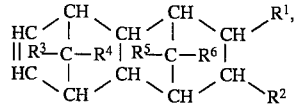 (III)

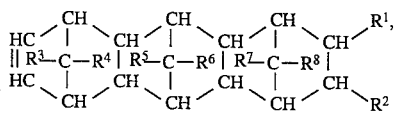 (IV)

in which $R^1$, $R^2$, $R^3$, $R^4$, $R^5$, $R^6$, $R^7$ and $R^8$ are identical or different and are a hydrogen atom or a $C_1$–$C_8$-alkyl radical or aryl radical, where identical radicals in the various formulae may have different meanings, from 0.1 to 99.9% by weight, based on the total amount of monomers, of a cycloolefin of the formula V

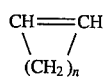 (V)

in which n is a number from 2 to 10, and from 0.1 to 99.9% by weight, based on the total amount of monomers, of at least one acyclic 1-olefin of the formula VI

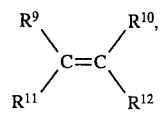 (VI)

in which $R^9$, $R^{10}$, $R^{11}$ and $R^{12}$ are identical or different and are a hydrogen atom or a $C_1$–$C_8$-alkyl radical, and are polymerized in solution, in suspension, in the liquid cycloolefin monomer or cycloolefin monomer mixture or in the gas phase, at a temperature from −78° to 150° C., at a pressure from 0.5 to 64 bar, in the presence of a supported catalyst system which comprises at least one aluminoxane of the formula VII

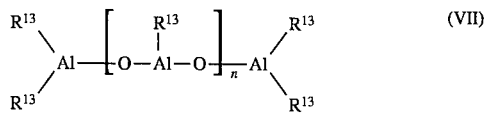 (VII)

for the linear type and/or of the formula VIII

 (VIII)

for the cyclic type, wherein in the formulae VII and VIII $R^{13}$ is a $C_1$–$C_6$-alkyl group or phenyl or benzyl and n is an integer from 2 to 50, and at least one metallocene compound of the formula IX

 (IX)

in which $M^1$ is titanium, zirconium, hafnium, vanadium, niobium or tantalum, $R^{14}$ and $R^{15}$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, and m can be one or two, depending on the valency of the central atom $M^1$, $R_{18}$ is

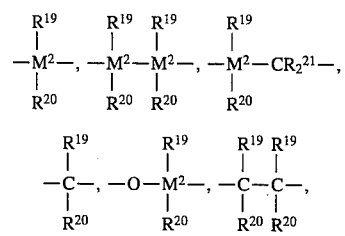

=$BR^{19}$=$AlR^{19}$, —Ge—, —Sn—, —O—, —S—, =SO, =$SO_2$, = $NR^{19}$, =CO=$PR^{19}$ or =P(O)$R^{19}$, where $R^{19}$, $R^°$ and $R^{22}$ are identical or different and are a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or $R^{19}$ and $R^{20}$ or $R^{19}$ and $R^{21}$ in each case form a ring with the atoms connecting them, $M^2$ is silicon, germanium or tin, $R^{16}$ and $R^{17}$ are identical or different and are a mononuclear or multinuclear hydrocarbon radical which can form the sandwich structure with the central atom $M^1$.

8. The process as claimed in claim 7, wherein the metallocene catalyst corresponds to a metallocene of the formula IX, in which $M^1$ is a metal selected from the group consisting of titanium, zirconium, hafnium, vanadium, niobium and tantalum, $R^{14}$ and $R^{15}$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom, m can be one or two, depending on the valency of the central atom $M^1$, $R^{16}$ and $R^{17}$ are identical or different and are a mononuclear or multinuclear hydrocarbon radical which can form a sandwich structure with the central atom $M^1$, $R^{18}$ is a single-membered or multi-membered bridge which links the radicals $R^{16}$ and $R^{17}$ and is

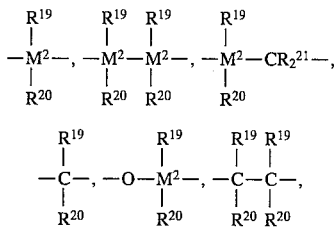

$=BR^{19}$, $=AlR^{19}$, —Ge—, —Sn—, —O—, —S—, $=SO$, $=SO_2$, $=SO_2$, $=NR^{19}$, $=CO$, $=PR^{19}$ or $=P(O)R^{19}$, where $R^{19}$, $R^{20}$ and $R^{21}$ are identical or different and are a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_{11}$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{19}$ and $R^{20}$ or $R^{19}$ and $R^{21}$ in each case form a ring together with the atoms connecting them, $M^2$ is silicon, germanium or tin.

9. The process as claimed in claim 7, wherein the metallocenes used are biscyclopentadienylzirconium dichloride, biscyclopentadienylzirconium dimethyl, biscyclopentadienylzirconium diphenyl, biscyclopentadienylzirconium dibenzyl, biscyclopentadienylzirconium bistrimethylsilyl, bis(methylcyclopentadienyl)zirconium dichloride, bis(1,2-dimethylcyclopentadienyl)zirconium dichloride, bis(1,3-dimethylcyclopentadienyl)zirconium dichloride, bis(1,2,4-trimethylcyclopentadienyl)zirconiumdichloride, bis(pentamethylcyclopentadienyl)zirconium dichloride, bis(ethylcyclopentadienyl)zirconium dichloride, bis(propylcyclopentadienyl)zirconium dichloride, bis(butylcyclopentadienyl)zirconium dichloride, bisfluorenylzirconium dichloride, bisindenylzirconium dichloride, diphenylmethylene(9-fluorenyl)(cyclopentadienyl)zirconium dichloride, diphenylmethylene(9-fluorenyl)(cyclopentadienyl)hafnium dichloride, dimethylsilyl-bis(cyclopentadienyl)zirconium dichloride, dimethylsilyl(9-fluorenyl)(cyclopentadienyl)zirconium dichloride, dimethylsilyl(9-fluorenyl)(cyclopentadienyl)hafnium dichloride, isopropylidene(9-fluorenyl)(cyclopentadienyl)zirconium dichloride, isopropylidene(9-fluorenyl)(cyclopentadienyl)hafnium dichloride, dimethylsilyl-bis(9-fluorenyl)zirconium dichloride, dimethylsilyl-bis-1-tetrahydroindenylzirconium dichloride, dimethylsilyl-bis-1-(2-methyl-tetrahydroindenyl) zirconium dichloride, dimethylsilyl-bis-1-(2,3,5-trimethyl-cyclopentadienyl)zirconium dichloride, dimethylsilyl-bis-1-(2,3-dimethyl-cyclopentadienyl)zirconium dichloride, dimethylsilyl-bis-1-indenylzirconium dichloride, dimethylsilyl-bis-1-indenylzirconium dimethyl dimethylgermyl-bis-1-indenylzirconium dichloride, dimethylsilyl-bis-1-(2-methylindenyl)zirconium dichloride, dimethyl silyl-bis-1-(2-methyl-4-isopropylindenyl)zirconium dichloride, phenylmethylsilyl-bis-1-(2-methylindenyl)zirconium dichloride, dimethylsilyl-bis-1-(2-methyl-4 -ethylindenyl)zirconium dichloride, ethylene-bis-1-(4,7-dimethylindenyl)zirconium dichloride, phenyl(methyl)silyl-bis-1-indenylzirconium dichloride, phenyl(vinyl)silyl-bis-1-indenylzirconium dichloride, diphenylsilyl-bis-1-indenylzirconium dichloride, diphenylsilyl-bis-1-indenylzirconium dichloride, dimethylsilyl-bis-1-(2-methyl-4-tert.butylindenyl)zirconium dichloride, dichloride, methylphenylsilyl-bis-1-(2-methyl-4-isopropylindenyl)zirconium dimethylsilyl-bis-1-(2-ethyl-4-methylindenyl)zirconium dichloride, dimethylsilyl-bis-1-(2,4-dimethylindenyl) zirconium dichloride, dimethylsilyl-bis-1-(2-methyl-4-ethylindenyl)-zirconium dimethyl dimethylsilyl-bis-1-(2-methyl-4,6-diisopropylindenyl)zirconium dichloride, dimethylsilyl-bis-1-(2,4,6-trimethylindenyl)zirconium dichloride, methylphenylsilyl-bis-1-(2-methyl-4,6 -diisopropylindenyl)zirconium dichloride, 1,2-ethanediyl-bis-1-(2-methyl-4, 6-diisopropylindenyl)zirconium dichloride, dimethylsilyl-bis-1-(2-methyl-4,5-benzoindenyl)zirconium dichloride, dimethylsilyl-bis-1-(2-methyl-4-phenylindenyl)zirconium dichloride, ethylene-bis(1-indenyl)zirconium dichloride, ethylene-bis-1-(4,5,6,7-tetrahydroindenyl)zirconium dichloride, ethylene-bis-1-(1-indenyl)hafnium dichloride, dimethylsilyl-bis-1-(4,5-benzoindenyl)zirconium dichloride, isopropyl-(cyclopentadienyl)(1-indenyl)zirconium dichloride, isopropyl-(3-methylcyclopentadienyl)(1-indenyl)zirconium dichloride, dimethylsilyl(cyclopentadienyl)(1-indenyl) zirconium dichloride, dimethylsilyl-bis(3-methylcyclopentadienyl)zirconium dichloride, dimethylsilyl-bis(2,4-dimethylcyclopentadienyl)zirconium dichloride, methylethylene-bis(1-indenyl)zirconium dichloride,methylphenylcarbyl(9-fluorenyl)(cyclopentadienyl)zirconium dichloride, diphenylsilyl(9-fluorenyl(cyclopentadienyl)zirconium dichloride, dimethylsilyl(9-(2,7-ditertbutylfluorenyl))(cyclopentadienyl)zirconium dichloride, diphenylcarbyl(9-(2,7 -ditertbutylfluorenyl))(cyclopentadienyl)zirconium dichloride, isopropyl(9-(2,7-ditertbutylfluorenyl))(cyclopentadienyl)zirconium dichloride, isopropyl(9-fluorenyl)(1-(3-methylcyclopentadienyl))zirconium dichloride, isopropyl(9-fluorenyl)(1-(3-isopropylcyclopentadienyl))zirconium dichloride, dimethylsilyl(9-fluorenyl)(1-(3-methylcyclopentadienyl))zirconium dichloride, dimethylsilyl(9-fluorenyl)(1-(3-isopropylcyclopentadienyl))zirconium dichloride, isopropyl(9-fluorenyl)(1-indenyl)zirconium dichloride, or dimethylsilyl(9-fluorenyl)(1-indenyl) zirconium dichloride.

10. The process as claimed in claim 6, wherein the cocatalyst used is an aluminoxane of the formula VII

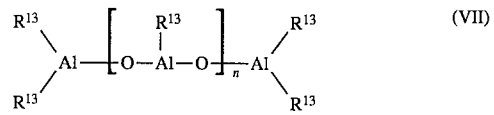

for the linear type and/or of the formula VIII

for the cyclic type, in which $R^{13}$ is a $C_1$–$C_6$-alkyl group, n is an integer from 2 to 50.

11. The process as claimed in claim 4, wherein the average porosity of the partition lies between 0.25 and 20 μm.

12. The process as claimed in claim 4, wherein the average porosity of the partition lies between 2 and 10 μm.

13. The process as claimed in claim 5, wherein said inorganic support materials are magnesium chloride or a partially crystalline polyolefin powder which is insoluble under the polymerization conditions and is in finely divided form.

14. The process as claimed in claim 8, wherein $M^1$ is zirconium or hafnium, $R^{14}$ and $R^{15}$ are identical or different and are a hydrogen atom, a $C_1$–$C_3$-alkyl group, a $C_1$–$C_3$-alkoxy group, a $C_6$–$C_8$-aryl group, a $C_6$–$C_8$-aryloxy group, a $C_2$–$C_4$-alkenyl group, a $C_7$–$C_{10}$-arylalkyl group, a $C_7$–$C_{12}$-alkylaryl group, a $C_8$–$C_{12}$-arylalkenyl group or a chlorine, and $R^{18}$ is $=CR^{19}R^{20}$, $=SiR^{19}R^{20}$, $=GeR^{19}R^{20}$, —O—, —S—, =SO, $=PR^{19}$ or $=P(O)R^{19}$.

15. The process as claimed in claim 8, wherein $R^{18}$ a is a single-membered or multi-membered bridge which links the radicals $R^{16}$ and $R^{17}$ and is

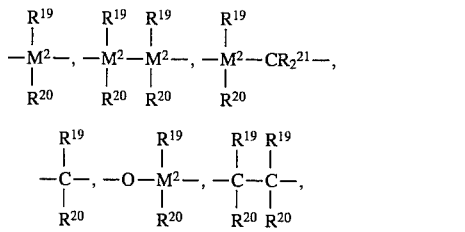

$=BR^{19}$, $=AlR^{19}$, —Ge—, —Sn—, —O—, —S—, =SO, $=SO_2$, $=NR^{19}$, =CO, $=PR^{19}$ or $=P(O)R^{19}$, where $R^{19}$, $R^{20}$ and $R^{21}$ are identical or different and are a hydrogen atom, a chlorine atom, a $C_1$–$C_3$-alkyl group, a $CF_3$ group, a pentafluorophenyl group, a $C_6$–$C_8$-aryl group, a $C_1$–$C_4$-alkoxy group, $C_2$–$C_4$-alkenyl group, a $C_7$–$C_{10}$-arylalkyl group, $C_8$–$C_{12}$-arylalkenyl group, or a $C_7$–$C_{12}$-alkylaryl group, $M^2$ is silicon or germanium and $M^1$ is zirconium or hafnium.

16. The process as claimed in claim 10, wherein $R^{13}$ is a methyl, ethyl, isobutyl, butyl, neopentyl, phenyl or benzyl and n is from 5 to 40.

17. The process as claimed in claim 10, wherein $R^{13}$ is methyl and n is 5 to 40.

18. The process as claimed in claim 8, wherein $R^{14}$ and $R^{15}$ are identical or different and are a hydrogen atom, a $C_1$–$C_3$-alkyl group, a $C_1$–$C_3$-alkoxy group, a $C_6$–$C_8$-aryloxy group, a $C_2$–$C_4$-alkenyl group, a $C_7$–$C_{10}$-arylalkyl group, a $C_7$–$C_{12}$-alkylaryl group, a $C_8$–$C_{12}$-arylalkenyl group or a chlorine and $R^{18}$ is $=CR^{19}R^{20}$, $=SiR^{19}R^{20}$, $=GeR^{19}R^{20}$, —O—, —S—, =SO, $=PR^{19}$ or $=P(O)R^{19}$ and $R^{18}$ is a is a single-membered or multi-membered bridge which links the radicals $R^{16}$ and $R^{17}$ and is

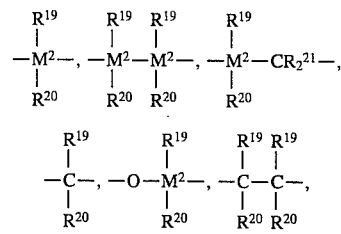

$=BR^{19}$, $=AlR^{19}$, —Ge—, —Sn—, —O—, —S—, =SO, $=SO_2$, $=NR^{19}$, =CO, $=PR^{19}$ or $=P(O)R^{19}$, where $R^{19}$, $R^{20}$ and $R^{21}$ are identical or different and are a hydrogen atom, a chlorine atom, a methyl group, a $CF_3$ group, a pentafluorophenyl group, a $C_6$–$C_8$-aryl group, a methoxy group, $C_2$–$C_4$-alkenyl group, a $C_7$–$C_{10}$-arylalkyl group, $C_8$–$C_{12}$-arylalkenyl group, or a $C_7$–$C_{12}$-alkylaryl group; $M^2$ is silicon or germanium, and $M^1$ is zirconium or hafnium.

\* \* \* \* \*